United States Patent [19]

Kukula et al.

[11] Patent Number: 5,537,598
[45] Date of Patent: Jul. 16, 1996

[54] SYSTEM FOR INSTALLING PROCESSOR CONTROL CODE

[75] Inventors: Dennis A. Kukula, Henderson, Nev.; Vern J. Legvold, Tucson, Ariz.

[73] Assignee: International Business Machnes Corporation, Armonk, N.Y.

[21] Appl. No.: 524,139

[22] Filed: Aug. 17, 1995

Related U.S. Application Data

[63] Continuation of Ser. No. 289,869, Aug. 12, 1994, abandoned, which is a continuation of Ser. No. 990,760, Dec. 15, 1992, abandoned.

[51] Int. Cl.⁶ .............................. G06F 9/24; G06F 15/16
[52] U.S. Cl. ................... 395/700; 395/200.8; 395/747; 364/DIG. 1; 364/280.2; 364/280; 364/229; 364/228.1
[58] Field of Search .................................. 395/700, 650, 395/200.08, 474, 479

[56] References Cited

U.S. PATENT DOCUMENTS

| | | | |
|---|---|---|---|
| 4,117,974 | 10/1978 | Ciaramella | 235/304 |
| 4,954,941 | 9/1990 | Redman | 364/200 |
| 5,142,680 | 8/1992 | Ottman et al. | 395/700 |
| 5,155,837 | 10/1992 | Liu et al. | 395/500 |
| 5,155,847 | 10/1992 | Kirouac et al. | 395/600 |
| 5,202,998 | 4/1993 | Yanes | 395/725 |
| 5,247,683 | 9/1993 | Holmes et al. | 395/700 |
| 5,257,368 | 10/1993 | Benson et al. | 395/600 |
| 5,295,263 | 3/1994 | Kojima et al. | 395/650 |
| 5,359,730 | 10/1994 | Marron | 395/650 |

OTHER PUBLICATIONS

"Device/Profile Installation Procedure with Validation", IBM Technical Disclosure Bulletin, vol. 28, No. 4, Sept. 1985.

*Primary Examiner*—Kevin A. Kriess
*Attorney, Agent, or Firm*—Benman, Collins and Sawyer

[57] ABSTRACT

A system for automatically installing new processor control code in a computing system running old processor control code with minimal disruption in the operation thereof. The new code is loaded into the computing system and compared to the old code to identify values of a plurality of updating variables. Changes in the operation of the computing system are effected based on the values of the updating variables without disrupting the operation thereof. In a specific embodiment, the inventive system includes microcode in which resource management variables are labeled and given predetermined values. The resource management variables are compared to corresponding variables in the old code to determine which resources to control to effect an updating of the system. Thus, substantial changes in microcode are effected automatically and without disruption.

4 Claims, 6 Drawing Sheets

SYSTEM FOR INSTALLING PROCESSOR CONTROL CODE

This is a continuation of application Ser. No. 08/289,869, filed 08/12/94, abandoned, which is a continuation of application Ser. No. 07/990,760, filed 12/15/92, now abandoned.

BACKGROUND OF THE INVENTION

1. Field of the Invention

The present invention relates to computing systems. More specifically, the present invention relates to systems and techniques for updating computing systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Computing systems typically include a microprocessor which controls input and output operations of numerous associated peripheral devices in accordance with a scheme (or BIOS, "basic input and output system") stored as microcode in a memory associated therewith. As the need to change the input/output control scheme changes, it is desirable to change the microcode by which these functions are performed by the microprocessor. This is typically accomplished by changing the microcode which controls the processor. However, this has been somewhat problematic.

For example, storage controllers (or "storage control units"), such as the 3990 unit sold by the International Business Machines (IBM) Corporation, typically include two clusters which allow access to a single set of direct access storage devices (DASDs). Each of the clusters are on a separate power boundary and each has the ability to load its own microcode. Each cluster has two microprocessors and each microprocessor provides a separate path to the storage devices. Within each microprocessor, microcode regulates access by the host to the storage device.

The traditional method of updating the microcode in each cluster involves a disruption in the operation of the cluster while the microcode is loaded and the cluster is reinitialized. The procedure may take up to one-half hour per cluster in the conventional system. In this context, "disruptive" implies that the customer losses access to the data behind the control unit until the new microcode has been loaded into both clusters using a power on/reset. Hence, lengthy service disruptions are generally undesirable.

An alternative, though no less undesirable, approach is to limit the updating microcode to small changes. However, this is not practical where significant and substantial changes in the microcode are in order.

Thus, there is a need in the art for a technique for substantially updating microcode with minimal disruption in the operation of a control processor.

SUMMARY OF THE INVENTION

The need in the art is addressed by the present invention which provides a system for automatically installing new processor control code in a computing system running old processor control code with minimal disruption in the operation thereof. The new code is loaded into the computing system and compared to the old code to identify values of a plurality of updating variables. Changes in the operation of the computing system are effected based on the values of the updating variables without disrupting the operation thereof.

In a specific embodiment, the inventive system includes microcode in which resource management variables are labeled and given predetermined values. The resource management variables are compared to corresponding variables in the old code to determine which resources to control to effect an updating of the system. Thus, substantial changes in microcode are effected automatically and without disruption.

DESCRIPTION OF THE INVENTION

The present invention will now be described in connection with a storage controller as an illustrative embodiment in an exemplary application with reference to the accompanying drawings to disclose the advantageous teachings thereof.

An appreciation of the present invention is facilitated by an understanding of a typical conventional main frame computer system in terms of the resources which must be managed. This will facilitate an understanding of the need for changes or updates in the processor control code (microcode) by which the resources are managed.

Figure 1:
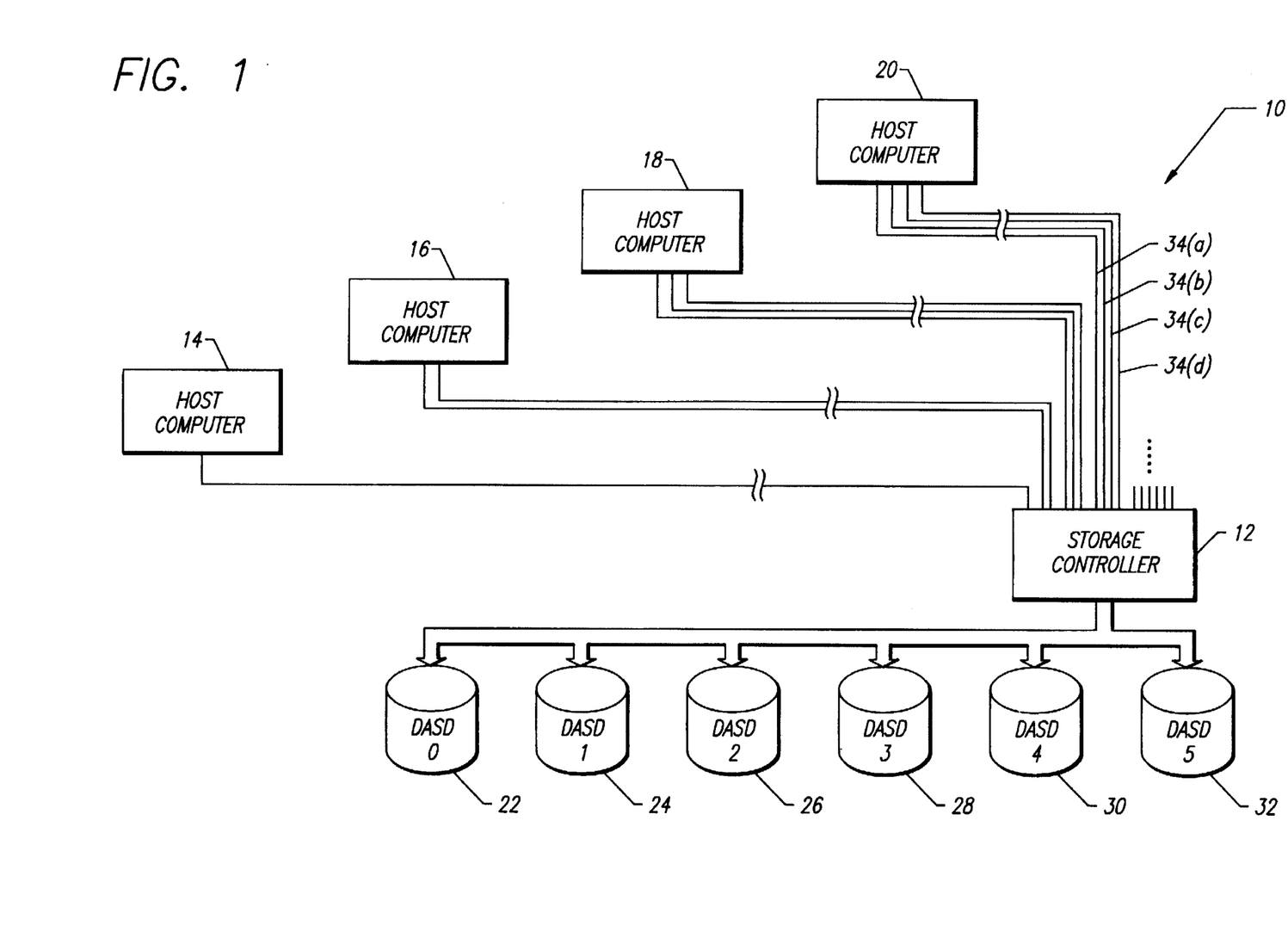
FIG. 1 is a block diagram of a data processing system.

FIG. 1 shows a high level block diagram of a data processing system 10. The system 10 includes a storage controller 12, a plurality of host computers 14, 16, 18 and 20 and a plurality of direct access storage devices (DASD) 22–32. Presently, disk drive units are the most common type of DASD. In large multiple computer data processing systems, a large number of direct access storage devices serve several computers.

The storage controller 12 is logically positioned between the host computers 14–20 and the DASDs 22–32. The storage controller 12 handles connection and disconnection between a particular computer and magnetic disk unit for transfer of a data record.

The IBM Model 3990 storage controller, is an example of a storage controller used to control connections between magnetic disk units and host computers. The host computers 14–20 are typically main frame systems such as the IBM 3090, the Model ES9000, or other comparable systems.

The IBM 3990 Model 3 type controller can handle up to sixteen channels from host computers and up to sixty-four magnetic storage units. Hence, the host computers 14–20 are connected to storage controller 12 by at least one and by up to four channels. For example, the host computer 20 is connected to storage controller 12 by channels 34(a), 34(b), 34(c) and 34(d). Although four host computer systems and six direct storage devices are depicted in FIG. 1, the storage controller 12 can handle additional channels and direct access storage devices.

Figure 2:
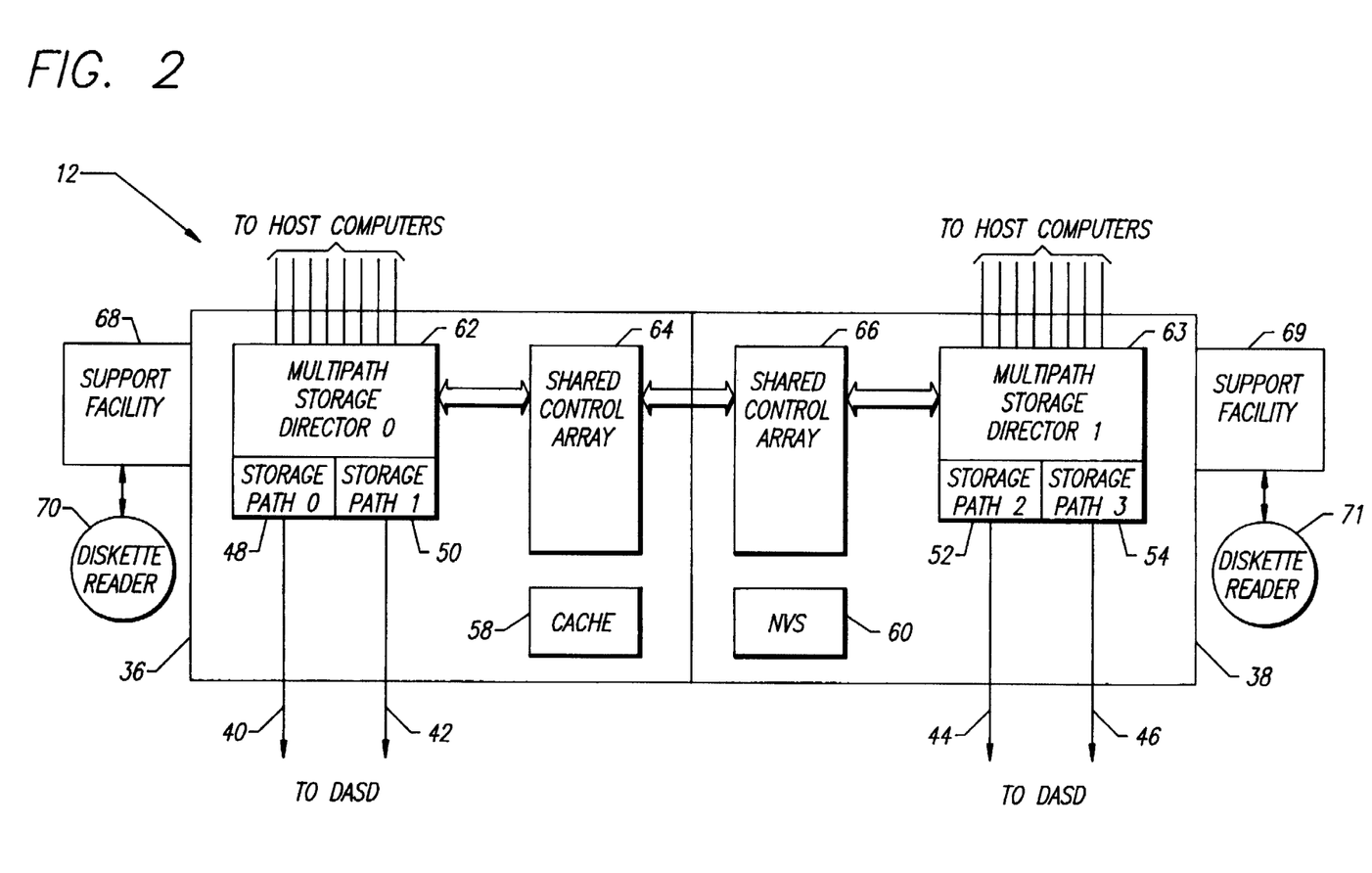
FIG. 2 is a block diagram of the storage controller of the data processing system of FIG. 1.

FIG. 2 depicts the storage controller 12 in greater detail. The storage controller 12 has two storage clusters 36 and 38, each of which provides for selective connection between a host computer and a direct access storage device. The clusters 36 and 38 are on separate power boundaries. The first cluster 36 includes a first multipath storage director 62 with associated storage paths 48 and 50, a shared control array 64 and a cache memory 58. The second cluster 38 includes a second multipath storage director 63 with associated storage paths 52 and 54, a shared control array (SCA) 66 and a non-volatile store (NVS) 60.

Figure 3:
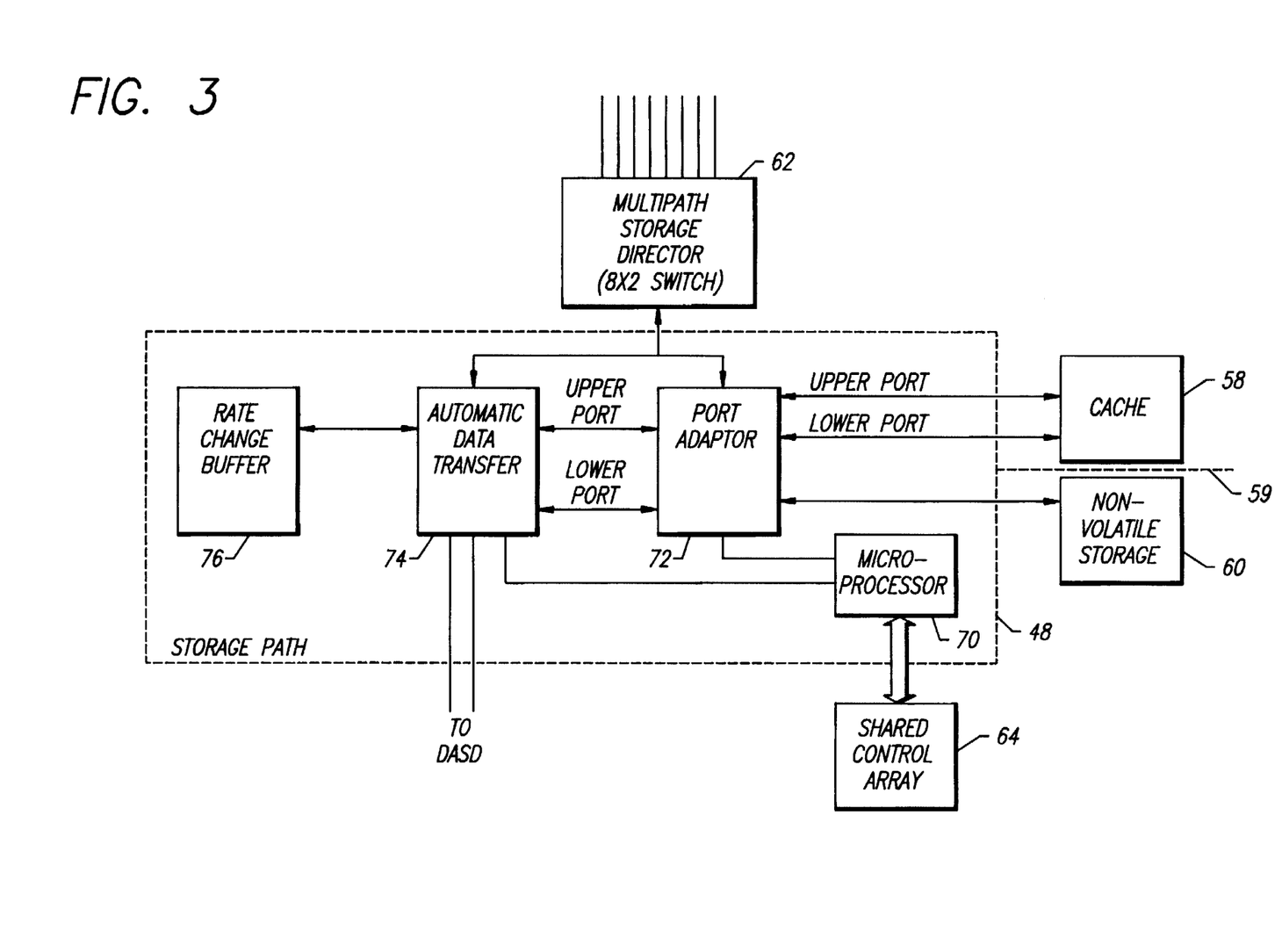
FIG. 3 is a block diagram of a storage path for the storage controller of the data processing system of FIG. 1.

FIG. 3 is a block diagram of a storage path. The storage path 48 is connected to a multipath storage director 62 by an upper port and to a plurality of direct access storage devices by a lower port. Data transfer between the multipath storage director 62 and one of the direct access storage devices during synchronous operations occurs via an automatic data transfer circuit 74 supported by a rate change buffer 76, if required. Rate change buffer 76 compensates for differences between the speed of data transfer by disk drive type, DASDs and the operating speed of the channels to host computers. The channels typically handle data at a faster rate than the direct access storage devices.

A port adapter 72 controls transfer of data between the cache 58, the nonvolatile store 60 and the lower port. The port adapter 72 also controls transfer of data between cache 58 and the upper port. As discussed above, the presence of cache 58 and non-volatile store 60 provide for logical completion of certain data transfers without waiting for physical synchronization of disk and channel connection. All operations of the storage path 48 are under control of a microprocessor 70. Processor control microcode is executed by the microprocessor in the storage path to control the operation of the storage controller. Hence, while each storage path is, in effect, a stand alone control unit based upon its own microprocessor, the storage paths share processor control information through the SCA for synchronization functions for handling connections, disconnection and reconnections relating to a transaction.

Returning to FIG. 2, each storage path in the storage controller has access to three addressable memory devices used for supporting storage controller operation. The three memory devices are: the cache 58; the non-volatile store 60; and the shared control array 64/66. The three memory devices and asynchronous work elements comprise the shared structures of the 3990 control unit.

Cache is best known for its application as an adjunct to computer memory where it is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. The contents of cache are duplicated in system memory. Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducer used to read and write the data. By duplicating frequently accessed data in cache, read time for data is reduced and data storage system throughput is considerably enhanced. High speed components are expensive in terms of cost per byte of storage, particularly when compared with magnetic media storage and thus cache is quite small compared to the memory device. For the purposes of the present disclosure it should be noted that when cache has been made unavailable, no attempt is made to access the cache until a "Make Cache Available" command is received from the host.

Nonvolatile storage (NVS) serves as a backup to the cache for the buffering function. Access to NVS is faster than access to a direct access storage device, but generally slower than cache. Data are branched to cache and to NVS to back up the cache in case of power failure. Data written to NVS have been treated as being as safe as if written to magnetic media. Upon staging of a data record to NVS indication is given to the host computer that the data are successfully stored. The NVS is required for Fast Write operations and to establish Dual Copy pairs. If cache is made unavailable, all Fast Write data will be destaged during the make unavailable process and no new Fast Write data will be written to the NVS until cache is made available. When cache is unavailable, the NVS is still required to maintain the bit maps defining the cylinders that are out-of-sync between the primary and secondary devices for Dual Copy.

A shared control array (SCA) is a memory array which is shared over all storage paths. There are typically two types of data in the SCA. The first is data to support the DASD and the second is the data to support the caching and extended functions (i.e. Fast Write and Dual Copy).

Another resource available to the mainframe computer may be an asynchronous work element (AWE). An AWE is a task performed by any processor by which data is taken from the cache and written or "destaged" to DASD. These structures control the internal work elements which control the asynchronous function required by the caching control unit (i.e. Pack Change, destaged modified data, cache space management, etc.)

Clearly, the two clusters in the 3990 control unit share data structures. As the operational requirements of the system change and as new and improved features of the system are made available, changes in the operation of the system particularly with respect to the management of the many resources mentioned above, are in order. These changes are implemented by changing the microcode which controls the operation of the system through the microprocessors 70. As mentioned above, the conventional approach for making significant changes in the microcode involves a disruption in the operation of the system while the new microcode is loaded into microprocessor memory, typically via a support facility (diskette reader, 68 & 69 in FIG. 2). The traditional method of updating the microcode in each cluster involves a disruption in the operation of the cluster while the microcode is loaded and the cluster is reinitialized. As this procedure may take up to one-half hour, the service disruption is generally undesirable.

The need in the art for a technique for substantially updating microcode with minimal disruption in the operation of control processor is addressed by the present invention. The invention provides a system for automatically installing new processor control code in a computing system running old processor control code with minimal disruption in the operation thereof. In connection with the 3990 control unit, the invention recognizes that the affected shared structure is only used during caching operations. When this occurs, the cache can be made unavailable and the new microcode can be installed non-disruptively. In general, as discussed in detail below, the new code is loaded into the computing system and compared to the old code to identify values of a plurality of updating variables. Changes in the operation of the computing system are effected based on the values of the updating variables without disrupting the operation thereof.

In a specific embodiment, the inventive system includes microcode in which resource management variables are labeled and given predetermined values. The resource management variables are compared to corresponding variables in the old code to determine which resources to control to effect an updating of the system. Thus, substantial changes in microcode are effected automatically and without disruption.

The device SCA structures have historically been stable and generally only change when new microcode supports a new device type. When this occurs, the new microcode will be implemented, during an update in accordance with the present teachings, to store data in the SCA for existing devices using the existing format. The new format will be used only for new devices. This will only affect the fetching and storing of data in the SCA. Since the control store within a Storage Path is not shared, the structures used in control store of the new microcode can be implemented in a single format. The following steps define the concurrent nondisruptive microcode installation scenario afforded by the present invention.

1. Vary channel paths off to cluster from host;
2. Disable interfaces to the cluster;
3. Use the Support Facility to quiet cluster;
4. Load in new diskettes;
5. Use Support Facility to resume cluster;
6. Enable interfaces;
7. Vary channel paths on to cluster from host;
8. Repeat for other cluster.

A key aspect of the invention is the identification of microcode install variables (MIVs). Install values are assigned to each variable in each new release. Action is taken only if the value of an MIV changes between releases. Thus, a nondisruptive install occurs when a shared structure changes that does not affect a device.

In the illustrative implementation, the following install variables are defined:

| | | |
|---|---|---|
| Disruptive | = | The new microcode is disruptive; |
| Cache Unavailable | = | The cache must be unavailable during the install process; |
| NVS Unavailable | = | The NVS must be unavailable during the install process; |
| AWE Limiting | = | All AWEs must be run on the latest level of microcode during the install process; and |
| Reserved | = | Space reserved for additional undefined variables. In the illustrative embodiment, these variables have been assigned a value of zero. |

During installation, the new microcode being installed will cause the microprocessor 70 to compare the MIV values of the old microcode to the MIV values of the new microcode. The following list defines the processing initiated by the microcode if an install values between the old and new microcode are not equal.

Disruptive Variable: The install process will not complete and a message will be written on the Support Facility (SF) panel.

Cache Unavailable Variable: If the cache is available, the install process is stopped and the cache is made unavailable in an automatic mode of operation or a message is written to the SF panel instructing the CE (Customer Engineer) to make cache unavailable before restarting the install process.

NVS Unavailable Variable: If the NVS is available, the install process is stopped and the NVS is made unavailable in an automatic mode of operation or a message is written to the SF panel instructing the CE to make NVS unavailable before restarting the install process.

AWE Limiting Values: The microcode will dispatch AWEs only on the cluster that was just loaded.

The install variable values are contained in the microprocessor memory (control store) of each storage path. When a cluster undergoes an initial microcode load (IML), a check is made to determine if the other cluster has been loaded. If the other cluster has not been loaded, the install variable values will be moved from the control store to the SCA. If the other cluster has been loaded, the install variable values are compared to the values currently stored in the SCA. The compare is a 'not equal' regardless of the magnitude of the difference or if the new is less than the old. This facilitates installation of 'old code' as well as an upgraded version.

In one implementation of the invention, if the disruption values are not equal, the storage facility is used to display a message on the maintenance panel and the install process is terminated. If the cache unavailable values are not equal, a check is made to ensure that the state of the cache is 'UNAVAILABLE'. If it is unavailable, the new value replaces the old value in the SCA and the install continues. If cache is available, the SF is used to display a message on the maintenance panel and the install process is halted.

The processing for the NVS Unavailable signal is identical to that for Cache Unavailable.

If the AWE Limiting Values are not equal, the new value is stored into the SCA and a re-initialization is invoked. The re-initialization will cause AWEs to be terminated and re-initialized. AWEs will only be dispatched on SPs (storage path, FIG. 3) whose AWE limiting variable values equals those in the SCA. This allows only the new microcode to run with the new structures. Creates for new AWEs by old microcode will be blocked since they would be created using the old structure. This can be achieved by returning an 'in progress' code if an attempt is made to create a new AWE on a down level SP. This 'in progress' code will result in routing the create process to another SP. The create function is modified to reject non-AWE creates which will block asynchronous device maintenance (i.e. move device heads) and channel commands (e.g. Perform Subsystem Function and Set System Mode). Creates for Pack-Changes will still be performed on any level of microcode but executed only on the new microcode. Erroneous Power-on IML with different code loads. This will cause the last cluster up to think that it has the desirable code load an proceed to force the other cluster to run degraded, without AWEs.

Figure 4A:
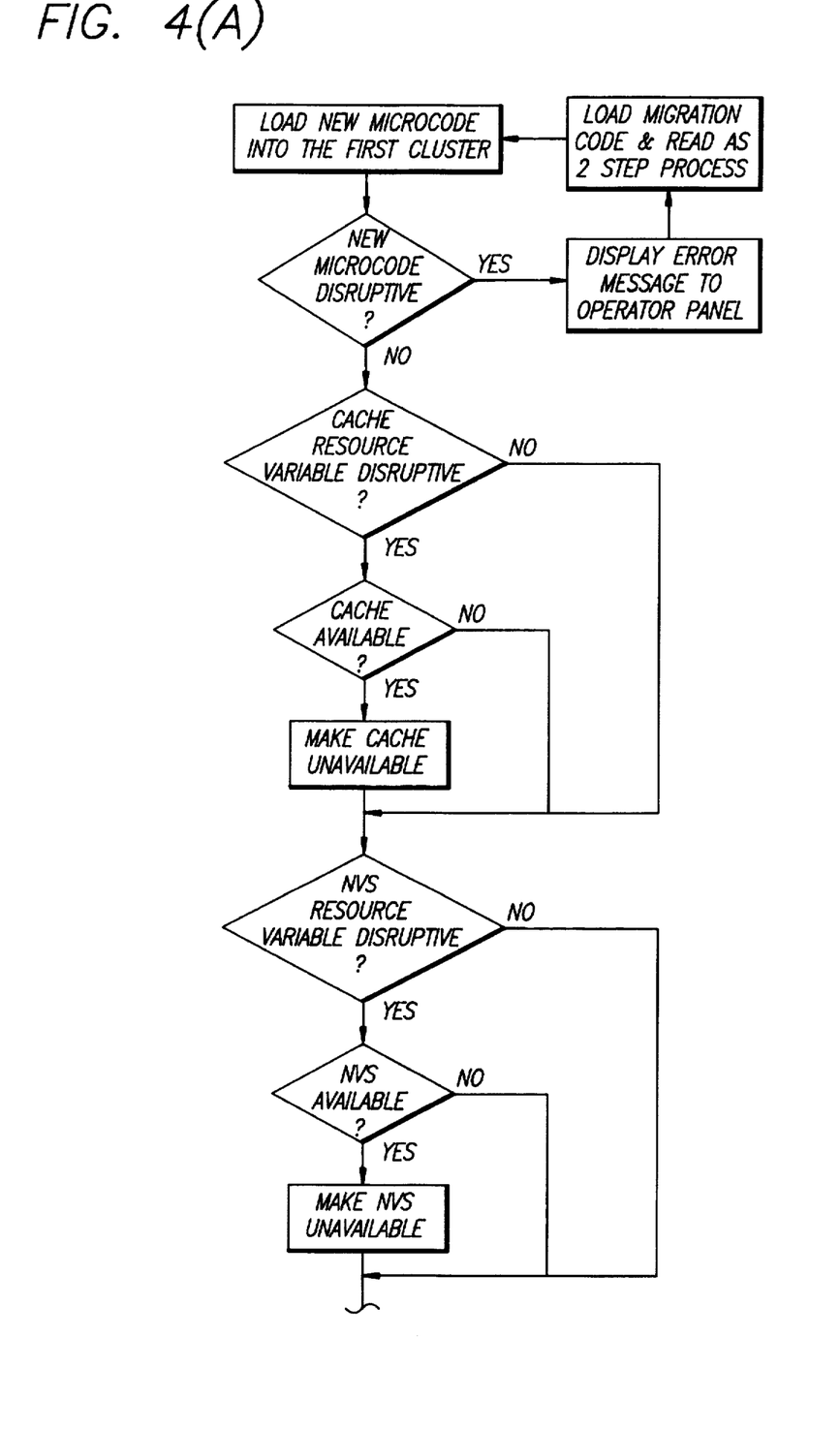
FIG. 4(A) shows a first portion of a flow diagram illustrating an alternative preferred implementation by which microcode installs are performed automatically and without operator intervention.
Figure 4B:
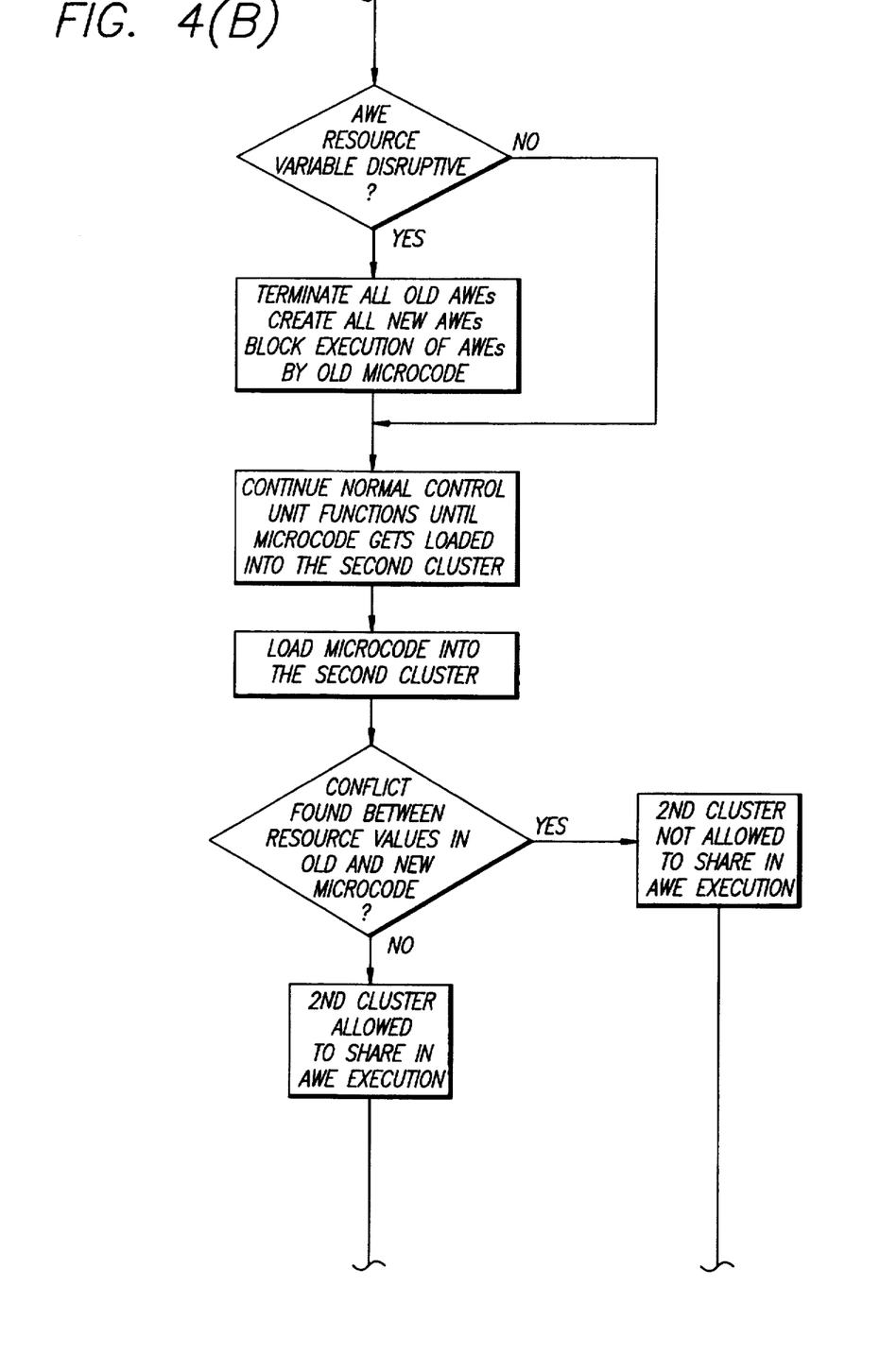
FIG. 4(B) shows a second portion of the flow diagram illustrating an alternative preferred implementation by which microcode installs are performed automatically and without operator intervention.
Figure 4C:
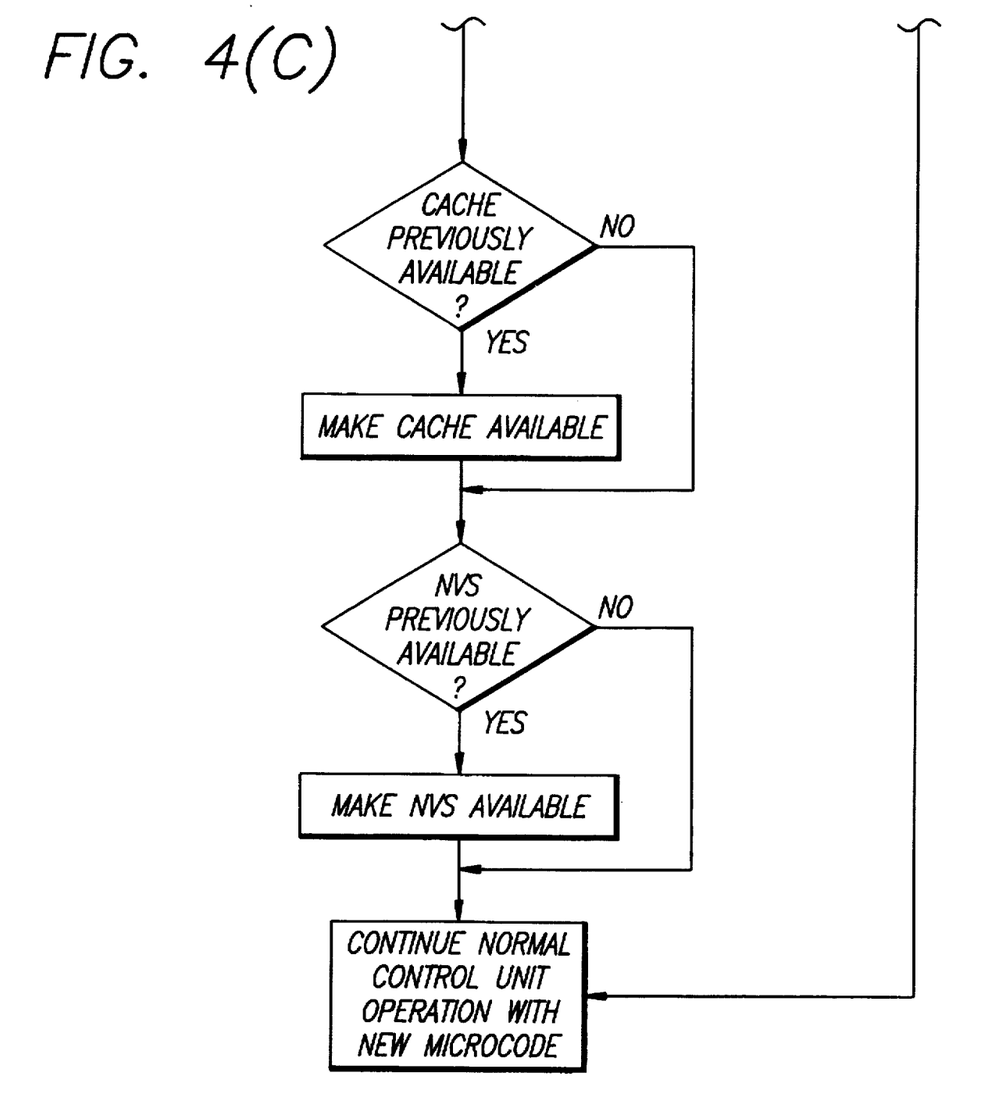
FIG. 4(C) shows a third portion of the flow diagram illustrating an alternative preferred implementation by which microcode installs are performed automatically and without operator intervention.

The above-described microcode provides for some operator involvement in the install of new microcode. FIG. 4 is a flow diagram illustrating an alternative preferred implementation by which microcode installs are performed automatically and without operator intervention.

Tables 1 and 2 below provide an example of the use of the invention to support the installation of microcode. In the example the microcode releases are defined as follows:

```
Rel 6.0 = Release of 3990 microcode to support new
          hardware platform.
Rel 6.1 = Enhancements that did not update shared
          structures.
Rel 7.0 = Change caching algorithms.
Rel 8.0 = Add support of new device format and changed
          AWE structure.
```

TABLE 1

Variable Values for the four Microcode Releases

| Release | Disruptive | Cache Unavailable | NVS Unavailable | AWE Limiting |
|---------|------------|-------------------|-----------------|--------------|
| Rel 6.0 | 0 | 0 | 0 | 0 |
| Rel 6.1 | 0 | 0 | 0 | 0 |
| Rel 7.0 | 0 | 1 | 0 | 0 |
| Rel 8.0 | 0 | 2 | 1 | 1 |

TABLE 2

| Old Microcode Level | Install Processing | | | |
| | Rel 6.0 | Rel 6.1 | Rel 7.0 | Rel 8.0 |
|---|---|---|---|---|
| Rel 6.0 | Non-disruptive | Non-disruptive | Non-disruptive<br>Cache must be Un-<br>available | Non-disruptive<br>Cache and NVS must<br>be Unavailable<br>AWEs limited to new<br>level |
| Rel 6.1 | Non-disruptive | Non-disruptive | Non-disruptive<br>Cache must be Un-<br>available | Non-disruptive<br>Cache and NVS must<br>be Unavailable<br>AWEs limited to new<br>level |
| Rel 7.0 | Non-disruptive<br>Cache must be Un-<br>available | Non-disruptive<br>Cache must be Un-<br>available | Non-disruptive | Non-disruptive<br>Cache and NVS must<br>be Unavailable<br>AWEs limited to new<br>level |
| Rel 8.0 | Non-disruptive<br>Cache and NVS must<br>be Unavailable<br>AWEs limited to new<br>level | Non-disruptive<br>Cache and NVS must<br>be Unavailable<br>AWEs limited to new<br>level | Non-disruptive<br>Cache and NVS must<br>be Unavailable<br>AWEs limited to new<br>level | Non-disruptive |

Thus, the present invention has been described herein with reference to a particular embodiment for a particular application. Those having ordinary skill in the art and access to the present teachings will recognize additional modifications applications and embodiments within the scope thereof. For example, the invention is not limited to use with storage controllers. The invention may be used in any computing system using control code that is updated from time to time.

It is therefore intended by the appended claims to cover any and all such applications, modifications and embodiments within the scope of the present invention.

Accordingly,
What is claimed is:

1. A storage controller for providing uninterrupted access by a host computer to a shared memory during a microcode update, said storage controller comprising:

first and second processors, said first processor executing first processor microcode and said second processor executing said first processor microcode;

storage means shared between said first processor and said second processor for storing data; and means for updating microcode in said first processor without interrupting access by said second processor to all data stored in said storage means, said means for updating including:

first means for installing second processor microcode into said first processor, second means for comparing the second processor microcode with the first processor microcode during installation of the second processor microcode into said first processor and identifying values of a first set of updating variables; and third means for effecting changes in the operation of said storage controller based on the values of said first set of updating variables without disrupting the operation thereof.

2. The invention of claim 1 further including means for installing said second processor microcode into said second processor.

3. The invention of claim 2 further including means for comparing the second processor microcode with the first processor microcode during installation of the second processor microcode into said second processor and identifying values of a second set of updating variables.

4. The invention of claim 3 further including means for effecting changes in the operation of said storage controller based on the values of said second set of updating variables without disrupting the operation thereof.

* * * * *

UNITED STATES PATENT AND TRADEMARK OFFICE
CERTIFICATE OF CORRECTION

PATENT NO. : 5,537,598
DATED : July 16, 1996
INVENTOR(S) : Kukula et al.

It is certified that error appears in the above-indentified patent and that said Letters Patent is hereby corrected as shown below:

On title page,
    item [73], Assignee, change "Machnes" to --Machines--.

Signed and Sealed this

Thirty-first Day of December, 1996

Attest:

BRUCE LEHMAN

*Attesting Officer*      *Commissioner of Patents and Trademarks*